Patented July 12, 1938

2,123,710

UNITED STATES PATENT OFFICE 2,123,710

PURIFICATION OF 3,3'-DICHLOROBENZIDINE MINERAL ACID SALTS

Harold G. Bowlus, Penns Grove, N. J., assignor to E. I. du Pont de Nemours & Company, Wilmington, Del., a corporation of Delaware No Drawing. Application November 6, 1936, Serial No. 109,455

3 Claims. (Cl. 260—130.5)

This invention relates to the purification of the mineral acid salts of 3,3'-dichlorobenzidine.

In Ber. 33, 3553 (1900) there is disclosed a method of purifying 3,3'-dichlorobenzidine hydrochloride by dissolving it in hydrochloric acid, filtering and precipitating by the addition of stronger hydrochloric acid. No quantitative data was given and the method as disclosed by that article does not give results which are commercially practicable.

It is an object of this invention to purify the mineral acid salts of 3,3'-dichlorobenzidine, and to prepare such salts in a condition of purity which is of advantage in the manufacture of azo dyestuffs.

The objects of the invention are accomplished by the utilization of a surprising discovery, namely, that the mineral acid salts of 3,3'-dichlorobenzidine can be commercially prepared in a condition of high purity by recrystallization from mineral acid solutions of critical concentration.

The invention as a whole will be disclosed with particular reference to the purification of 3,3'-dichlorobenzidine sulfate, but it will be readily understood from the disclosure which follows that this particular description does not limit the invention beyond the scope of the appended claims.

In the preferred form of the invention, crude dichlorobenzidine sulfate is dissolved at about 90° C. in about 36–40% sulfuric acid, preferably in 39% sulfuric acid. The heating is continued for the length of time necessary to bring about complete solution, for instance 15 minutes, and the product is cooled to about 25–30° C. and diluted with water until the acid concentration is between 0.5% and 20%. The addition of water may precede the cooling if desired or they may be simultaneously carried out. The batch is stirred for a length of time necessary to secure the optimum precipitation, for instance a half hour, and is filtered off and dried. It is substantially pure 3,3'-dichlorobenzidine sulfate. The described method of procedure may be varied considerably as to acid strength and solution strength.

It is desirable to have as large concentration of 3,3'-dichlorobenzidine sulfate as possible in the hot solution, and as small concentration as possible in the cold solution. This is preferably accomplished by selecting a concentration of sulfate below that at saturation (e. g. about 22 g. dichlorobenzidine $H_2SO_4$ per 100 g. 39% sulfuric acid) and heating to 90° C., or by selecting the saturation concentration in 39% sulfuric acid (26 g. per 100 g. 39% sulfuric acid) and heating to a temperature of 95–100° C.

The conditions giving the smallest concentration of 3,3'-dichlorobenzidine sulfate in the cold sulfuric acid may be attained by adding more sulfuric acid to increase the acid strength to say 50%, which is not economically desirable, or preferably by adding water to reduce the acid strength to a point at which the solubility of the product is extremely low. The amount of dilution which can be tolerated is dependent upon the size of the apparatus to be used, and upon a balance being struck between the 3,3'-dichlorobenzidine sulfate which is lost in the filtrate and the 3,3'-dichlorobenzidine sulfate precipitated by the increased dilution. For practical purposes, the range of sulfuric acid concentration on dilution may be set at 5–10%.

The crude 3,3'-dichlorobenzidine sulfate always contains small quantities of 2,2'-dichloroazobenzene, which may be removed by filtration of the hot sulfuric acid solution (which is not desirable on a plant scale owing to the weakness of material to the attack of hot dilute sulfuric acid), or by filtering the tetrazotized 3,3'-dichlorobenzidine solution before combining with the coupling component.

The purification of 3,3'-dichlorobenzidine hydrochloride may be carried out from a hydrochloric acid solution by a process similar to that used in purifying 3,3'dichlorobenzidine sulfate. The crude 3,3'-dichlorobenzidine hydrochloride may be dissolved with agitation in 1–3% hydrochloric acid (preferably 1–1½%) at 90° C., cooled to 25–30° C., the hydrochloric acid strength reduced to ¼–½% by the addition of water, the slurry agitated for ½ hr., and the recrystallized 3,3'-dichlorobenzidine hydrochloride filtered off and dried.

The variations described for the purification of 3,3'-dichlorobenzidine sulfate apply in an analogous manner to the purification of 3,3'-dichloro-benzidine hydrochloride.

The following examples illustrate but do not limit the invention:

Example I

*Purification of 3,3'-dichlorobenzidine sulfate*

500 g. of crude 3,3'-dichlorobenzidine sulfate containing 38% solids were charged into 315 g. of 98% sulfuric acid and 167 g. of water. The slurry was agitated, heated to 90–95° C., and held at that temperature for 15 minutes. 3620 g. of water were added to the hot solution, and the mixture was cooled to 25–30° C. while agitating.

The purified 3,3'-dichlorobenzidine sulfate was filtered off, the cake washed with 1000 g. of water, and dried at 80° C. The yield was about 95%.

EXAMPLE II

Purification of 3,3'-dichlorobenzidine hydrochloride 200 g. of crude 3,3'-dichlorobenzidine hydrochloride containing 50% solids were added to 62 g. of 30% hydrochloric acid and 1088 g. of water. The slurry was agitated, heated to 90-95° C., and held at that temperature for 15 minutes. 299 g. of 30% hydrochloric acid were added and the mixture was cooled while agitating to 25-30° C. The purified 3,3'-dichlorobenzidine hydrochloride was filtered off, washed with 500 g. of water and dried at 80° C.

It is desirable to give the purified filter cakes a light washing with water to remove the mother liquor, but too much washing is not desirable as the salts have a tendency to hydrolyze and lose the mineral acid.

By this invention there are removed by-products such as ortho-chloro-aniline, which is formed in the reduction of orthonitro-chlorobenzene; inversion isomers, formed by the inversion of 2,2'-dichloro-hydrazobenzene, and the similar by-products known to be present in benzidine salts. When used, these purified benzidine salts produce a clear and strong azo color unmarred by the off shades produced when ordinary tetrazotized benzidine is reacted with coupling components.

The present invention has the advantages of not using a volatile organic solvent, but the cheapest of mineral acids; the toxic benzidine base is not isolated, but rather the mineral acid salts which are nontoxic to those handling them; the simplest equipment found in any chemical plant are quite satisfactory for the operations, and the number of operations are much fewer than when an organic solvent is used.

I claim:

1. The process which comprises heating 3,3'-dichlorobenzidine mineral acid salt to about 90° C. in a mineral acid solution of that concentration in which the solubility of the acid salt is greatest and flooding the said solution with water.

2. The process which comprises dissolving 3,3'-dichlorobenzidine hydrochloride in about 1½% hydrochloric acid aqueous solution at about 90° C., cooling, and reducing the concentration of the acid in the said solution below 1%.

3. The process which comprises dissolving 3,3'-dichlorobenzidine sulfate in about 38% sulfuric acid aqueous solution at a temperature of about 90° C., cooling, and reducing the concentration of the acid below 25%.

HAROLD G. BOWLUS.